(12) United States Patent
Curello et al.

(10) Patent No.: US 8,512,911 B2
(45) Date of Patent: Aug. 20, 2013

(54) FUEL SUPPLY SYSTEMS HAVING OPERATIONAL RESISTANCE

(75) Inventors: Andrew J Curello, Hamden, CT (US);
Paul Spahr, New Haven, CT (US);
Floyd Fairbanks, Naugatuck, CT (US);
Michael Curello, Cheshire, CT (US)

(73) Assignee: Societe BIC, Clichy Cedex (FR)

( * ) Notice: Subject to any disclaimer, the term of this patent is extended or adjusted under 35 U.S.C. 154(b) by 668 days.

(21) Appl. No.: 12/091,226

(22) PCT Filed: Oct. 24, 2006

(86) PCT No.: PCT/US2006/041482
§ 371 (c)(1),
(2), (4) Date: Apr. 23, 2008

(87) PCT Pub. No.: WO2007/050609
PCT Pub. Date: May 3, 2007

(65) Prior Publication Data
US 2008/0226965 A1    Sep. 18, 2008

Related U.S. Application Data

(60) Provisional application No. 60/729,761, filed on Oct. 25, 2005.

(51) Int. Cl.
*H01M 8/04* (2006.01)

(52) U.S. Cl.
USPC ............................ 429/515; 429/513; 137/382

(58) Field of Classification Search
USPC .................... 137/382, 377; 251/179.8, 149.9
See application file for complete search history.

(56) References Cited

U.S. PATENT DOCUMENTS

| 4,469,762 | A |   | 9/1984  | Singh |
| 5,839,463 | A | * | 11/1998 | Blackmon et al. ............... 137/1 |
| 6,379,828 | B1 |  | 4/2002  | Worth |

(Continued)

FOREIGN PATENT DOCUMENTS

| JP | 2004-165000 A |   | 6/2004 |
| JP | 2004281341 A  |   | 10/2004 |
| JP | 2005129495 A  | * | 5/2005 |
| WO | 2005028899 A1 |   | 3/2005 |
| WO | 2006088450 A1 |   | 8/2006 |

(Continued)

OTHER PUBLICATIONS

International Search Report and Written Opinion issued in connection with corresponding international application PCT/US2006/041482 on Oct. 16, 2007.

(Continued)

*Primary Examiner* — Basia Ridley
*Assistant Examiner* — Heng Chan
(74) *Attorney, Agent, or Firm* — The H.T. Than Law Group (57) ABSTRACT

A fuel supply (1) including a cover (2) having an opening (8) for access to the fuel. The cover (2) includes a shutter (12) or similar element for closing off the opening (8) to increase the operational resistance to the insertion and/or removal of the fuel supply (1). In one embodiment, the cover (1) includes a support (6) with a rotatable cap (4), where the rotation of the cap causes the shutter (12) to open. In another embodiment, the cover includes a base and a slidable cap, where the slidable cap is the shutter. The shutter (12) may be manually actuated, mechanically actuated or electrically actuated. The cover (2) may be biased to the open position or to the closed position.

16 Claims, 11 Drawing Sheets

(56) References Cited

U.S. PATENT DOCUMENTS

| | | | |
|---|---|---|---|
| 6,858,335 B2 | 2/2005 | Schmidt et al. | |
| 2003/0041899 A1* | 3/2003 | Frank | 137/74 |
| 2003/0136453 A1* | 7/2003 | Johnson | 138/30 |
| 2005/0023236 A1 | 2/2005 | Adams et al. | |
| 2005/0045666 A1* | 3/2005 | Kasting | 222/482 |
| 2005/0074643 A1 | 4/2005 | Adams et al. | |
| 2006/0172171 A1 | 8/2006 | Deinzer et al. | |

OTHER PUBLICATIONS

Supplementary European Search Report issued in connection with the corresponding European Patent Application No. 06844215.1 on Mar. 13, 2012.

Machine translation of JP 2005129495 to Jun et al.

Machine translation of JP 2004-165000 to Satoshi et al.

Machine translation of JP 2004-281341 to Yasunari.

* cited by examiner

FUEL SUPPLY SYSTEMS HAVING OPERATIONAL RESISTANCE

FIELD OF THE INVENTION

This invention generally relates to fuel supply systems for various fuel cells, more specifically, the present invention relates to fuel supply systems having higher operational resistance.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel, and more efficient than portable power storage, such as lithium-ion batteries.

In general, fuel cell technologies include a variety of different fuel cells, such as alkali fuel cells, polymer electrolyte fuel cells, phosphoric acid fuel cells, molten carbonate fuel cells, solid oxide fuel cells and enzyme fuel cells. Today's more important fuel cells can be divided into several general categories, namely (i) fuel cells utilizing compressed hydrogen ($H_2$) as fuel, (ii) proton exchange membrane (PEM) fuel cells that use alcohols, e.g., methanol ($CH_3OH$), metal hydrides, e.g., sodium borohydride ($NaBH_4$), hydrocarbons, or other fuels reformed into hydrogen fuel, (iii) PEM fuel cells that can consume non-hydrogen fuel directly or direct oxidation fuel cells and (iv) solid oxide fuel cells (SOFC) that directly convert hydrocarbon fuels to electricity at high temperature.

Compressed hydrogen is generally kept under high pressure, and is therefore difficult to handle. Furthermore, large storage tanks are typically required, and cannot be made sufficiently small for consumer electronic devices. Conventional reformat fuel cells require reformers and other vaporization and auxiliary systems to convert fuels to hydrogen to react with oxidant in the fuel cell. Recent advances make reformer or reformat fuel cells promising for consumer electronic devices. The most common direct oxidation fuel cells are direct methanol fuel cells or DMFC. Other direct oxidation fuel cells include direct ethanol fuel cells and direct tetramethyl orthocarbonate fuel cells. DMFC, where methanol is reacted directly with oxidant in the fuel cell, is the simplest and potentially smallest fuel cell, and also has promising power application for consumer electronic devices. Solid oxide fuel cells (SOFC) convert hydrocarbon fuels, such as butane, at high heat to produce electricity. SOFC require relatively high temperature in the range of 1000° C. for the fuel cell reaction to occur.

The chemical reactions that produce electricity are different for each type of fuel cell. For DMFC, the chemical-electrical reaction at each electrode and the overall reaction for a direct methanol fuel cell are described as follows:

Half-Reaction at the Anode:

$$CH_3OH+H_2O \rightarrow CO_2+6H^++6e^-$$

Half-Reaction at the Cathode:

$$1.5O_2+6H^++6e^- \rightarrow 3H_2O$$

The Overall Fuel Cell Reaction:

$$CH_3OH+1.5O_2 \rightarrow CO_2+2H_2O$$

Due to the migration of the hydrogen ions ($H^+$) through the PEM from the anode to the cathode and due to the inability of the free electrons ($e^-$) to pass through the PEM, the electrons flow through an external circuit, thereby producing an electrical current through the external circuit. The external circuit may be used to power many useful consumer electronic devices, such as mobile or cell phones, calculators, personal digital assistants, laptop computers, and power tools, among others.

DMFC is discussed in U.S. Pat. Nos. 5,992,008 and 5,945,231, which are incorporated herein by reference in their entireties. Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

Another fuel cell reaction for a metal hydride, such as sodium borohydride, reformer fuel cell is as follows:

$$NaBH_4+2H_2O \rightarrow (\text{heat or catalyst}) \rightarrow 4(H_2)+(NaBO_2)$$

Half-Reaction at the Anode:

$$H_2 \rightarrow 2H^++2e^-$$

Half-Reaction at the Cathode:

$$2(2H^++2e^-)+O_2 \rightarrow 2H_2O$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water byproduct. Sodium borate ($NaBO_2$) byproduct is also produced by the reforming process. A sodium borohydride fuel cell is discussed in U.S. Pat. No. 4,261,956, which is incorporated herein by reference.

In a direct borohydride fuel cell (DBFC), the reaction is as follows:

Half-Reaction at the Anode:

$$BH_4^-+8OH^- \rightarrow BO_2^-+6H_2O+8e^-$$

Half-Reaction at the Cathode:

$$2O_2+4H_2O+8e^- \rightarrow 8OH^-$$

An important feature of fuel storage is to limit access to the fuel by unintended users. Commonly owned international patent application No. PCT/US05/04826, entitled "Fuel Supply Systems Having Operational Resistance" ("PCT '826"), filed on Feb. 16, 2005, discloses in detail multiple embodiments of fuel supplies with operational resistance. PCT '826 is incorporated herein by reference in its entirety. The present invention is directed to other embodiments of and/or improvements to the invention disclosed in PCT '826.

SUMMARY OF THE INVENTION

The present invention includes a cover for a fuel supply that limits access to a valve component on the fuel supply. The cover has an opening aligning with the valve component, and a shutter movable between a first position, where access to the valve component is limited, and a second position, where access to the valve component is not limited. The cover can be biased to the first position or to the second position.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

As illustrated in the accompanying drawings and discussed in detail below, the present invention is directed to a fuel supply, which stores fuel cell fuels such as methanol and water, methanol/water mixture, methanol/water mixtures of varying concentrations or pure methanol. Methanol is usable in many types of fuel cells, e.g., DMFC, enzyme fuel cells and reformat fuel cells, among others. The fuel supply may contain other types of fuel cell fuels, such as ethanol or other alcohols, metal hydrides, such as sodium borohydrides, other chemicals that can be reformatted into hydrogen, or other chemicals that may improve the performance or efficiency of fuel cells. Fuels also include potassium hydroxide (KOH) electrolyte, which is usable with metal fuel cells or alkali fuel cells, and can be stored in fuel supplies. For metal fuel cells, fuel is in the form of fluid borne zinc particles immersed in a KOH electrolytic reaction solution, and the anodes within the cell cavities are particulate anodes formed of the zinc particles. KOH electrolytic solution is disclosed in United States patent application publication no. 2003/0077493, entitled "Method of Using Fuel Cell System Configured to Provide Power to One or more Loads," published on Apr. 24, 2003, which is incorporated herein by reference in its entirety. Fuels also include a mixture of methanol, hydrogen peroxide and sulfuric acid, which flows past a catalyst formed on silicon chips to create a fuel cell reaction. Fuels also include a blend or mixture or methanol, sodium borohydride, an electrolyte and other compounds, such as those described in U.S. Pat. Nos. 6,554,877, 6,562,497 and 6,758,871, which are incorporated by reference in their entireties. Fuels also include those that are partially dissolved in solvent and partially suspended in solvent, described in U.S. Pat. No. 6,773,470, and those that include both liquid fuel and solid fuels, described in United States patent application publication no. 2002/0076602. These references are also incorporated by reference in their entireties.

Fuels also include a metal hydride such as sodium borohydride ($NaBH_4$) and water, discussed above and the low pressure, low temperature produced by such reaction. Fuels further include hydrocarbon fuels, which include, but are not limited to, butane, kerosene, alcohol and natural gas, disclosed in United States patent application publication no. 2003/0096150, entitled "Liquid Hereto-Interface Fuel Cell Device," published on May 22, 2003, which is incorporated herein by reference in its entirety. Fuels also include liquid oxidants that react with fuels. The present invention is, therefore, not limited to any type of fuels, electrolytic solutions, oxidant solutions or liquids or solids contained in the supply or otherwise used by the fuel cell system. The term "fuel" as used herein includes all fuels that can be reacted in fuel cells or in the fuel supply, and includes, but is not limited to, all of the above suitable fuels, electrolytic solutions, oxidant solutions, gases, liquids, solids and/or chemicals and mixtures thereof.

As used herein, the term "fuel supply" includes, but is not limited to, disposable cartridges, refillable/reusable cartridges, containers, cartridges that reside inside the electronic device, removable cartridges, cartridges that are outside of the electronic device, fuel tanks, fuel refilling tanks, other containers that store fuel and the tubings connected to the fuel tanks and containers. While a cartridge is described below in conjunction with the exemplary embodiments of the present invention, it is noted that these embodiments are also applicable to other fuel supplies and the present invention is not limited to any particular type of fuel supplies.

The fuel supply of the present invention can also be used to store fuels that are not used in fuel cells. These applications include, but are not limited to, storing hydrocarbons and hydrogen fuels for micro gas-turbine engine built on silicon chips, discussed in "Here Come the Microengines," published in The Industrial Physicist, (December 2001/January 2002), at pp. 20-25. As used in the present application, the term "fuel cell" also includes microengines. Other applications include storing traditional fuels for internal combustion engines, and hydrocarbons, such as butane for pocket and utility lighters and liquid propane.

Suitable fuel supplies or cartridges include all those disclosed in commonly owned PCT '826, incorporated by reference above. Broadly, fuel supply systems of the present invention include cooperating valve components. One valve component can be mated to a fuel cartridge containing fuel and the other valve component can be mated to a fuel cell, a refilling device or an electronic device powered by the fuel cell. The present invention generally applies to several types of fuel supply systems. One type of fuel supply system includes a first valve component and a second valve component connectable to the first valve component such that a flow path is established through the first and second valve components. As used herein, "valve components" include, but are not limited to, valve components having a seal, such as check valves, duckbill valves, electrical valves (e.g., solenoid valves), magnetic valve and washer with a closed slit (also known as septum), and valve components with no seal, such as an open tube, an outlet or a piercing needle. At least one of the valve components should have an internal seal. For example, a suitable valve may comprise one valve component having an internal seal and the other valve component having an open conduit so that when the internal seal opens a flow path is established therethrough. Suitable valve components also are discussed in United States patent application publication No. 2003/0082427. All of these references are incorporated herein by reference in their entireties.

PCT '826 discloses, among other things, a cover 600 adapted to cover the valve component(s) on a fuel supply, as shown in FIGS. 42A, 42B and 43 of PCT '826. Cover 600 may have aperture 618 positioned in alignment with valve component 510 to allow limited access to the valve component, as shown in FIGS. 45-46 and 57-58, among other figures. PCT '826 also discloses spring-loaded gate 746, which in a covered position limits access to valve component 726 or 728 and/or sensor 740, as shown in FIGS. 82A-84B. Gate 746, when in an uncovered position, allows access to the valve component(s) or sensor(s). A preferred embodiment of the present invention combines the operational resistant features of cover 600 and of gate 746 (referred to below as a shutter).

Figure 1:
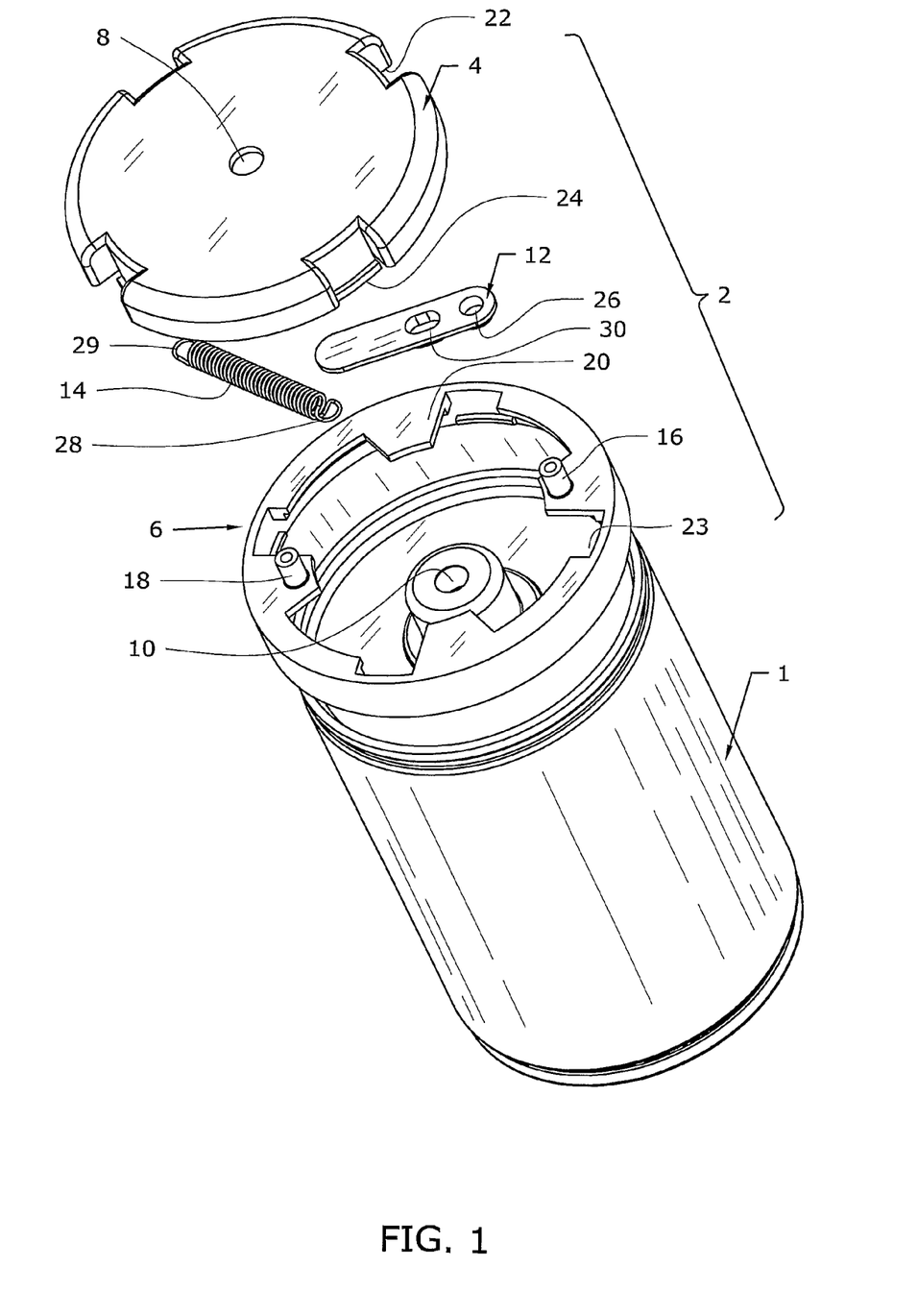
FIG. 1 is an exploded view of a first embodiment of a fuel supply having a closable cover according to an aspect of the present invention.

An embodiment of the present invention is shown in FIG. 1. Cartridge or fuel supply 1 may contain any type of fuel cell fuels, as discussed above. Fuel supply 1 includes a valve component 10, which preferably controls the release of fuel from fuel supply 1 before fuel supply 1 is connected to an electrical host device and/or fuel cell (not shown). The valve component 10 associated with fuel supply 1 is configured to open when acted upon by a corresponding valve component on the host device. Valve component 10 may be attached optionally to a fuel liner that contains the fuel. Suitable fuel liners are fully disclosed in commonly owned, co-pending U.S. patent application Ser. No. 10/629,004, entitled "Fuel Cartridge with Flexible Liner," filed on Jul. 29, 2003. The disclosure of this application is hereby incorporated by reference in its entirety.

Fuel supply 1 preferably includes a cover 2, which includes a rotatable cap 4 and a support 6. Rotatable cap 4 includes an opening 8 disposed therethrough which is sized and located to align with valve component 10, when cap 4 is positioned on fuel supply 1. Support 6 is a platform on which rotatable cap 4 rotates and is attached to fuel supply 1. A shutter 12 is configured to open and close opening 8 as rotatable cap 4 rotates relative to support 6.

Support 6 is preferably a unitary piece fixedly connected to fuel supply 1 by any means known in the art. Support 6 may be made of any material known in the art, but is preferably an impermeable material that is nonreactive to the type of fuel in fuel supply 1. For example, support 6 may be made of a metal, such as stainless steel, plastic, resin, polymers, or the like. Alternatively, support 6 is not unitary, but comprises multiple pieces made from different materials. Support 6 can be mounted to cartridge 1 by threads, welding, ultrasonic bonding, adhesives, press-fitting or any other known methods of attachment.

Figure 2A:
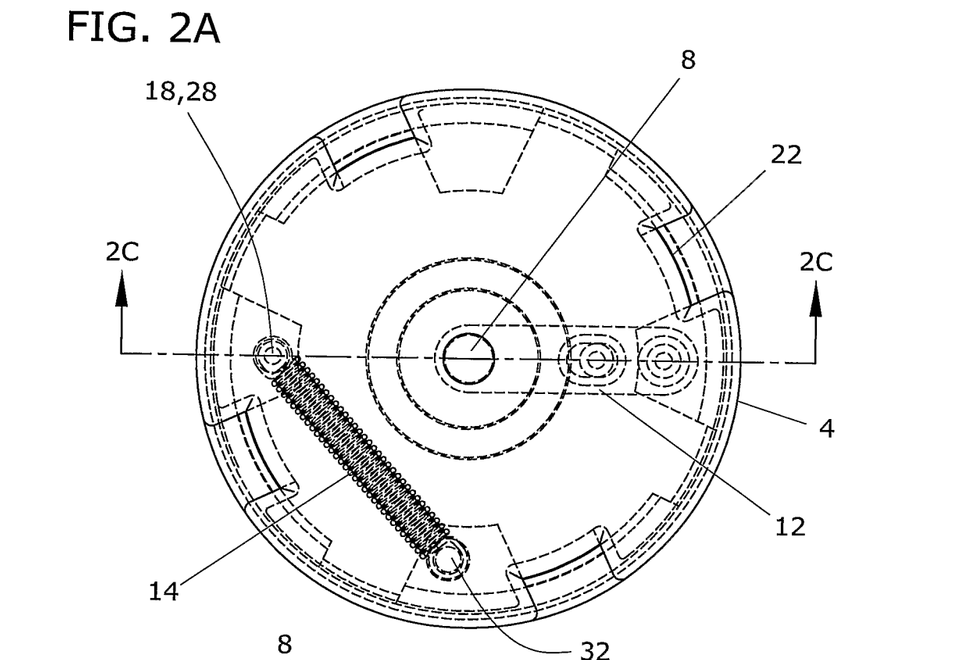
FIG. 2A is a top view of the cover shown in FIG. 1 in a closed position.
Figure 2B:
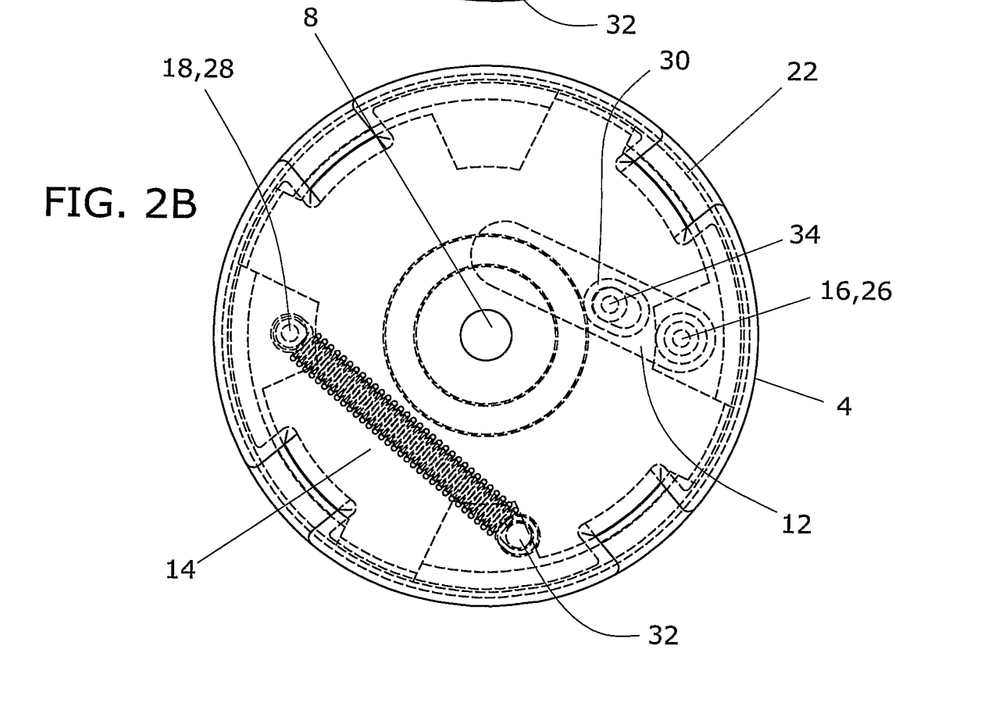
FIG. 2B is a top view of the cover shown in FIG. 1 in an open position.
Figure 2C:
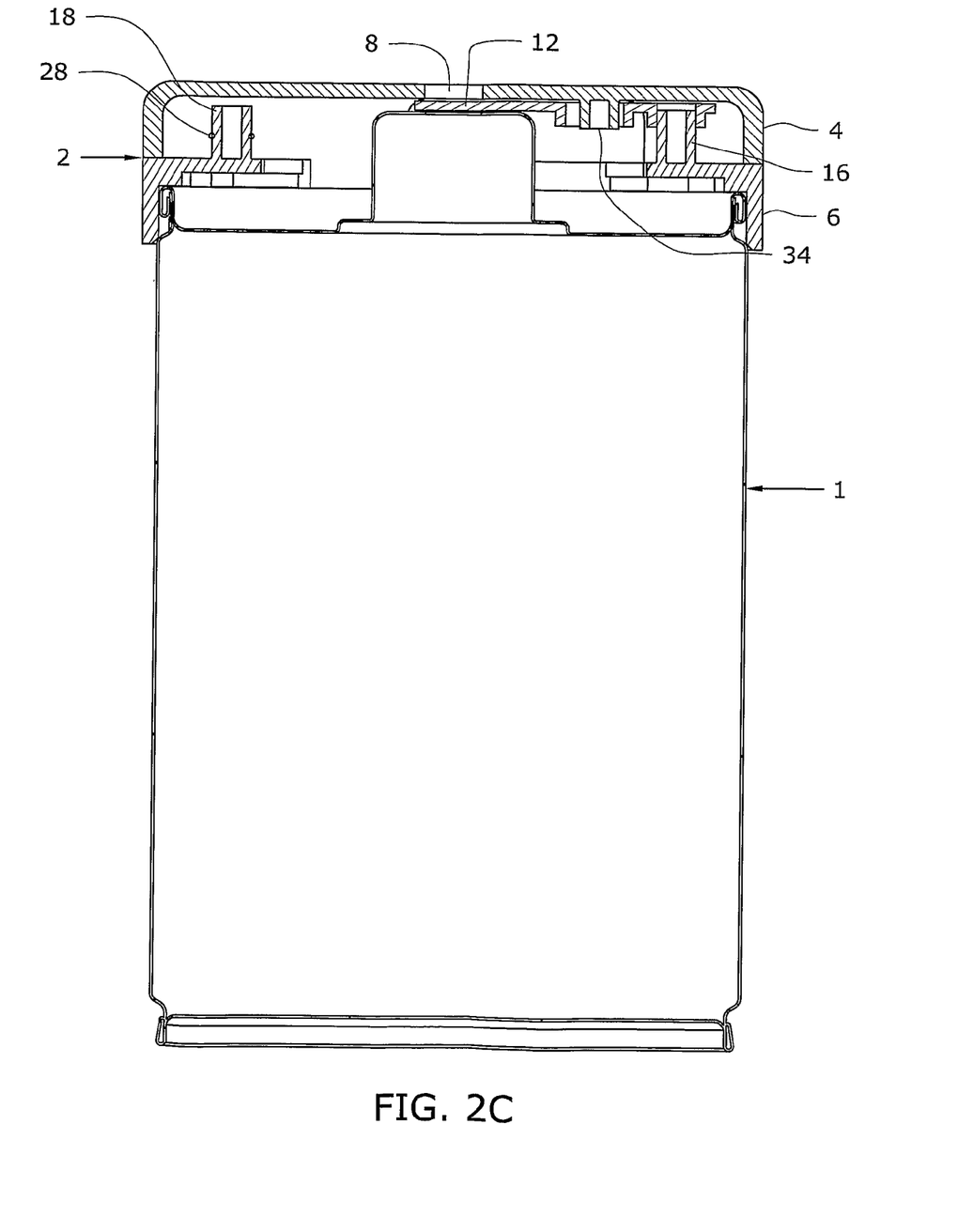
FIG. 2C is a cross-sectional view of the cover of FIG. 2 taken along line 2C-2C in FIG. 2A.

Support 6 includes a shutter mount post 16 and a spring mount post 18. Both posts 16 and 18 are preferably a co-formed extension of support 6, such as by co-molding or machining. A spring 14 is provided to connect cap 4 to support 6. Spring 14, which may be any type of spring known in the art such as a helical spring, includes a first loop 28 at one end and a second loop 29 at the opposite end. One of the loops is configured to be retained on spring mount post 18 of support 6, and the other loop is configured to be retained on a cap spring post 32 on cap 4 (shown in FIG. 2), so that cap 4 is normally biased to a closed position relative to cap 6 as described below. In one embodiment, spring 14 is preferably a high force spring, stiff spring, or a spring with high spring constant that requires a force of at least about 3 kg in a simple or single motion to rotate cap 4 relative to cap 6 to move cover 2 to an open position. More preferably, the required force is at least about 4 kg and most preferably at least about 5 kg. This force can be as low as about 2.25 or 2.5 kg.

As will be apparent to those of skill in the art, spring 14 may also be an arm (not shown) or similar member engaged on one end with support 6 and with the opposite end thereof engaged with cap 4. The material of the arm is selected to allow the arm to deform elastically to allow cap 4 to rotate with respect to support 6 while still resisting such rotation. A restorative energy is stored within the arm when deformed so that cap 4 may be automatically rotated to return shutter 12 to the closed configuration.

Cap 4 and support 6 also include an interlocking feature so that cap 4 is retained to support 6. The interlocking feature also helps to guide the rotation of cap 4 relative to support 6. On cap 4, the interlocking feature includes at least one downwardly extending leg 22 with a rim 24 extending outward from the bottom of leg 22. Preferably, cap 4 includes four downwardly extending legs 22, although any number of legs 22 is contemplated, as well as none at all.

Legs 22 align with corresponding notches 23 formed on support 6. When so aligned, rim 24 may be slidably inserted underneath a locking rail 36, best shown in FIGS. 3A and 3B. Locking rail 36 is an extension from the circumference of support 6. Rim 24 catches underneath locking rail 36 so that rim 24 is guided along locking rail 36 when cap 4 is rotated relative to support 6. In other words, cap 4 can be attached to or detached from support 6 only when legs 22 are aligned with notches 36. In this manner, legs 22 and notches 23 act as a mechanical keying mechanism as well. Any number of legs 22 and notches 23 can be utilized, and the angular spacing between legs 22 or notches 23 can be even or uneven.

Shutter 12 is configured to rotatably attach at one end to shutter mount post 16 on support 6, while the other end of shutter 12 is free and is movable between a closed position, where the free end of shutter 12 covers cap opening 8, and an open position, where the free end of shutter 12 moves away from cap opening 8. While shutter 12 may be made of any material known in the art such as metal, plastic or the like, the free end of shutter 12 may optionally include an elastomeric material such as rubber or silicone to seal opening 8.

Figure 3A:
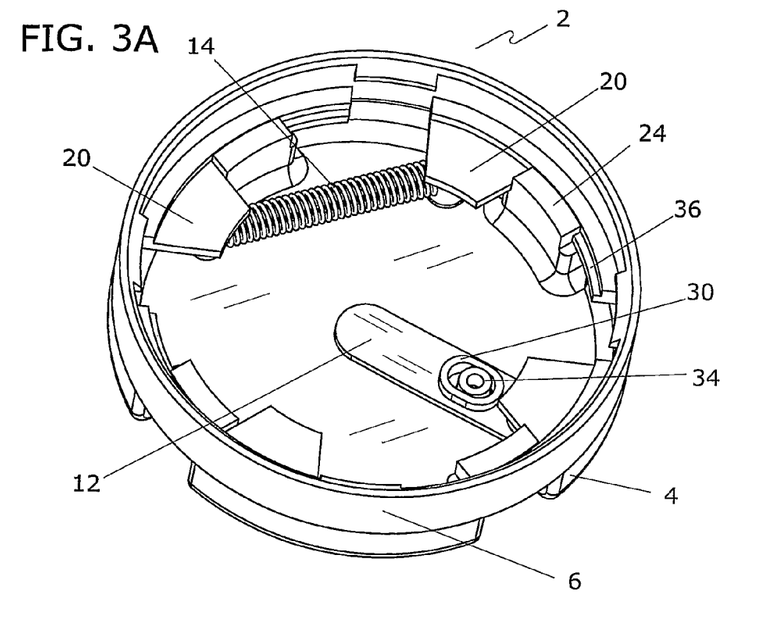
FIG. 3A is a perspective view of the bottom of the cover of FIG. 1 with the cover in a closed configuration.
Figure 3B:
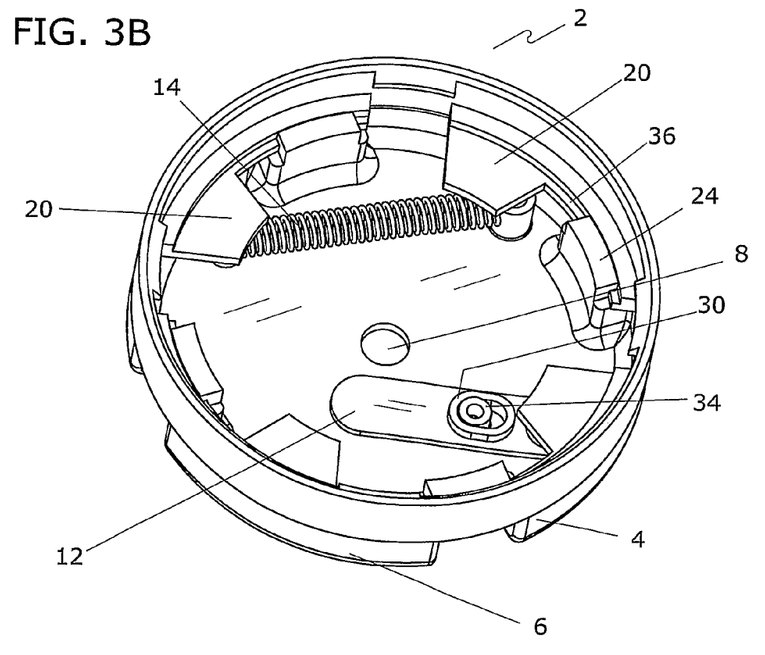
FIG. 3B is a perspective view of the bottom of the cover of FIG. 1 with the cover in an open configuration.

One end of shutter 12 includes an opening 26 configured to be retained to shutter mount post 16 on support 6, discussed above. As best shown in FIGS. 3A and 3B, at or near the midpoint of shutter 12 is slide opening 30. Slide opening 30 provides a track for a shutter slide pin 34, which is fixedly attached on the underside of cap 4, to fit therein. Slide opening 30 is larger than pin 34 so that pin 34 can move within opening 34. When cap 4 is rotated to the closed position, pin 34 directs the free end of shutter 12 to cover opening 8. When cap 4 is rotated to the open position, pin 34 directs the free end of shutter 12 to move away from opening 8. In other words, pin 34 actuates the opening and closing of cap opening 8 when cap 4 is rotated relative to support 6. Slide opening 30 can have an oval shape, as shown, or a circular, polygonal, or any other shape.

An additional benefit of the slide opening 30 and pin 34 configuration is that when pin 34 encounters either end of the track defined by slide opening 30, the rotation of cap 4 is stopped. As such, cap 4 cannot be rotated to realign legs 22 with notches 23, thereby inhibiting disassembly of cover 2.

In another embodiment, shutter 12 may be a solid piece without any opening such as slide opening 30. In such a case, two pins would be disposed on cap 4, similar to pin 34, where the two pins are positioned along opposing edges of the periphery of shutter 12 to guide the motion thereof.

Spring 14 provides a biasing force to keep cover 2 in a closed configuration, such as is shown in FIG. 3A. To move cover 2 to the open position, i.e., the configuration shown in FIG. 3B, the force of spring 14 is overcome in order to rotate cap 4. When that force is removed, spring 14 automatically returns cap 4 to its normally closed position, thereby closing cover 2. The force to rotate cap 4 may be provided by any means known in the art, such as by manual force by the intended user. Alternatively, a tab (not shown) may extend from cap 4 with a corresponding stop positioned on the host device. As fuel supply 1 is inserted into position, the stop encounters the tab such that any additional force causes the tab to pivot on the stop. This motion translates into rotation of cap 4.

Additionally, fuel absorbent materials, such as fibers, fillers or powders, can be included within cover 2, e.g., between cap 4 and support 6, or under and around opening 8. The absorbent material may also be attached to shutter 12, such as in a recess formed therein for receiving the absorbent material. Fuel absorbent materials can be added to any of the embodiments of the present invention.

Figures 4, 5A, 5B:
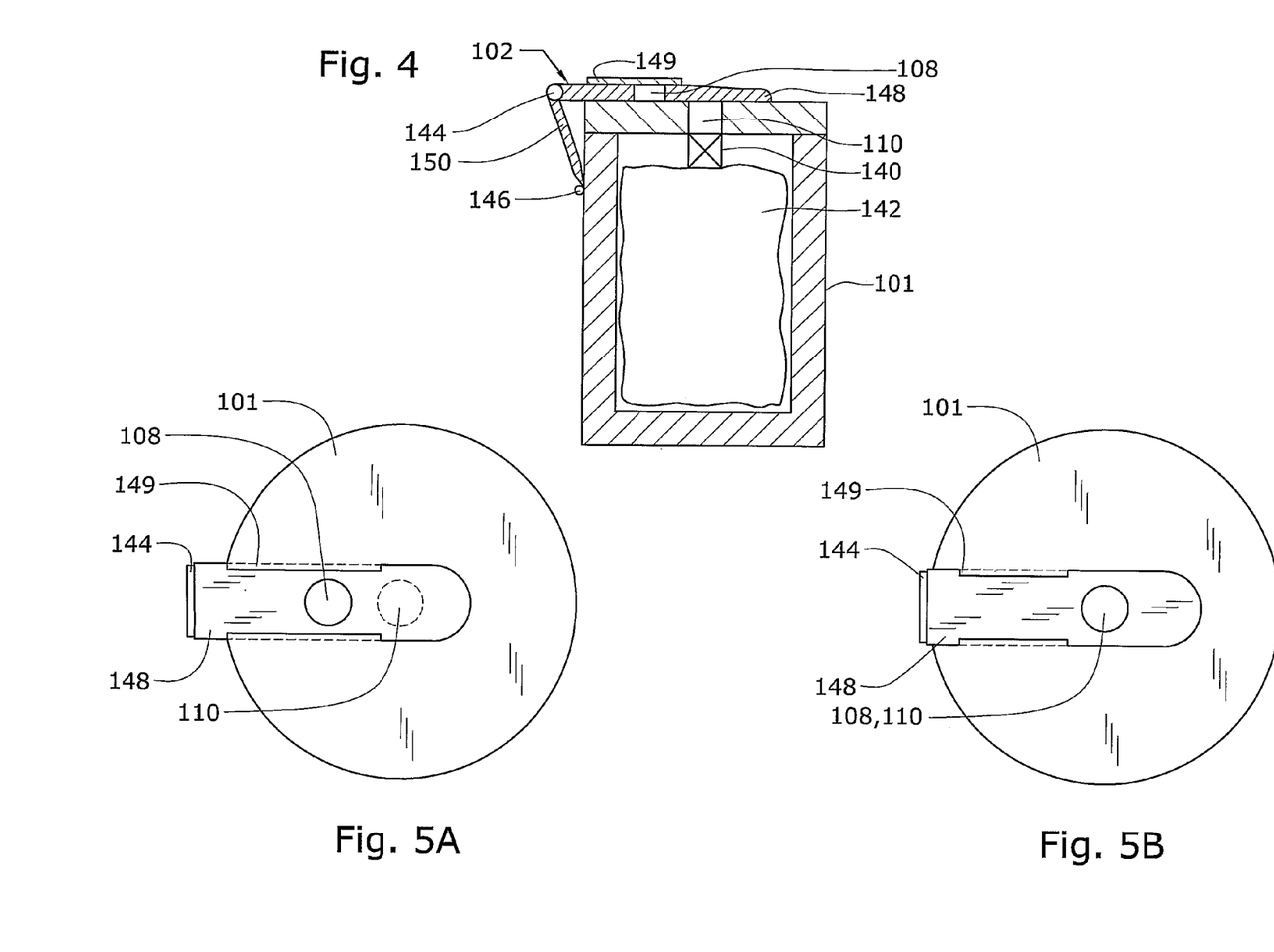
FIG. 4 is a cross-sectional side view of an alternate embodiment of a fuel supply having a closable cover.
FIG. 5A is a top view of the cover shown in FIG. 4 in a closed configuration.
FIG. 5B is a top view of the cover shown in FIG. 4 in an open configuration.

FIG. 4 shows another embodiment of a fuel supply 101 having a cover 102. Fuel supply 101 is similar to fuel supply 1 as discussed above, in that fuel supply 101 may contain any type of fuel known in the art and may be made from a variety of materials. In this embodiment, a valve component 140 is connected to an optional fuel liner 142. Valve component 140 is similar to valve component 10 discussed above, and preferably is a one-way valve such as a check valve or a duckbill valve. Valve component 140 mates with a corresponding valve component on the host device (not shown) to transfer fuel from fuel supply 101 to the host device.

Valve component 140 may be optionally disposed below a hole 110, as shown. Hole 110 is preferably formed through one side, such as the top, of fuel supply 101. Cover 102 restricts access to hole 110 until fuel supply 101 is connected to the host device. To this end, cover 102 includes a slidable top portion 148 pivotally attached to a side portion 150, which is attached fuel supply 101. Preferably, slidable top portion 148 is a tongue-like element slidably attached to the top of fuel supply 101, such as by being inserted into a track 149 formed on the top of fuel supply 101, so that the sliding motion of slidable top portion 148 may be guided. Slidable top portion 148 may be made of any material known in the art, such as metal or plastic.

A cover opening 108 is formed on slidable top portion 148 such that in an open position cover opening 108 may be aligned with hole 110 and valve component 140 to allow the host device to access the fuel inside the fuel supply. In a closed position, opening 108 is misaligned with hole 110 to limit access to valve component 140. Preferably, cover 102 is biased to the closed position. Cover opening 108 is preferably a hole formed through slidable top portion 148. Optionally, cover opening 108 may be surrounded by an elastomeric material to form a seal around nozzle 110 when cover opening 108 and nozzle 110 are aligned.

Slidable top portion 148 is connected to a side 152 of fuel supply 101 by side hinged portion 150. One end of side hinged portion 150 is attached to slidable top portion 148 by a pin 144 which acts as a hinge so that top portion 148 may rotate with respect to side hinged portion 150. The other end of side hinged portion 150 is attached to side 152 by a hinge 146, which may be any type of hinge known in the art, but which is preferably a spring-loaded hinge configured to push side hinged portion 150 away from side 152 to bias cover 102 to the closed position, shown in FIG. 5A. Alternatively, side portion 150 is connected to side 152 by a live joint so that side portion 150 is bendable relative to side 152.

Cover 102 may be actuated to the open position, shown in FIG. 5B where cover opening 108 and nozzle 110 align. Side hinged portion 150 is pushed with sufficient force toward side 152 of the fuel supply to overcome the biasing action of hinge 146. As side hinged portion 150 is pushed towards side 152, slidable top portion 148 is also pushed via pin 144. Slidable top portion 148 can slide along optional track 149 until side hinged portion 150 is flush or nearly flush against side 152. As described above, cover 102 may be actuated by any means known in the art, such as manually by the user, a system of tabs and stops, magnetically, or the like.

Figures 6, 7A, 7B:
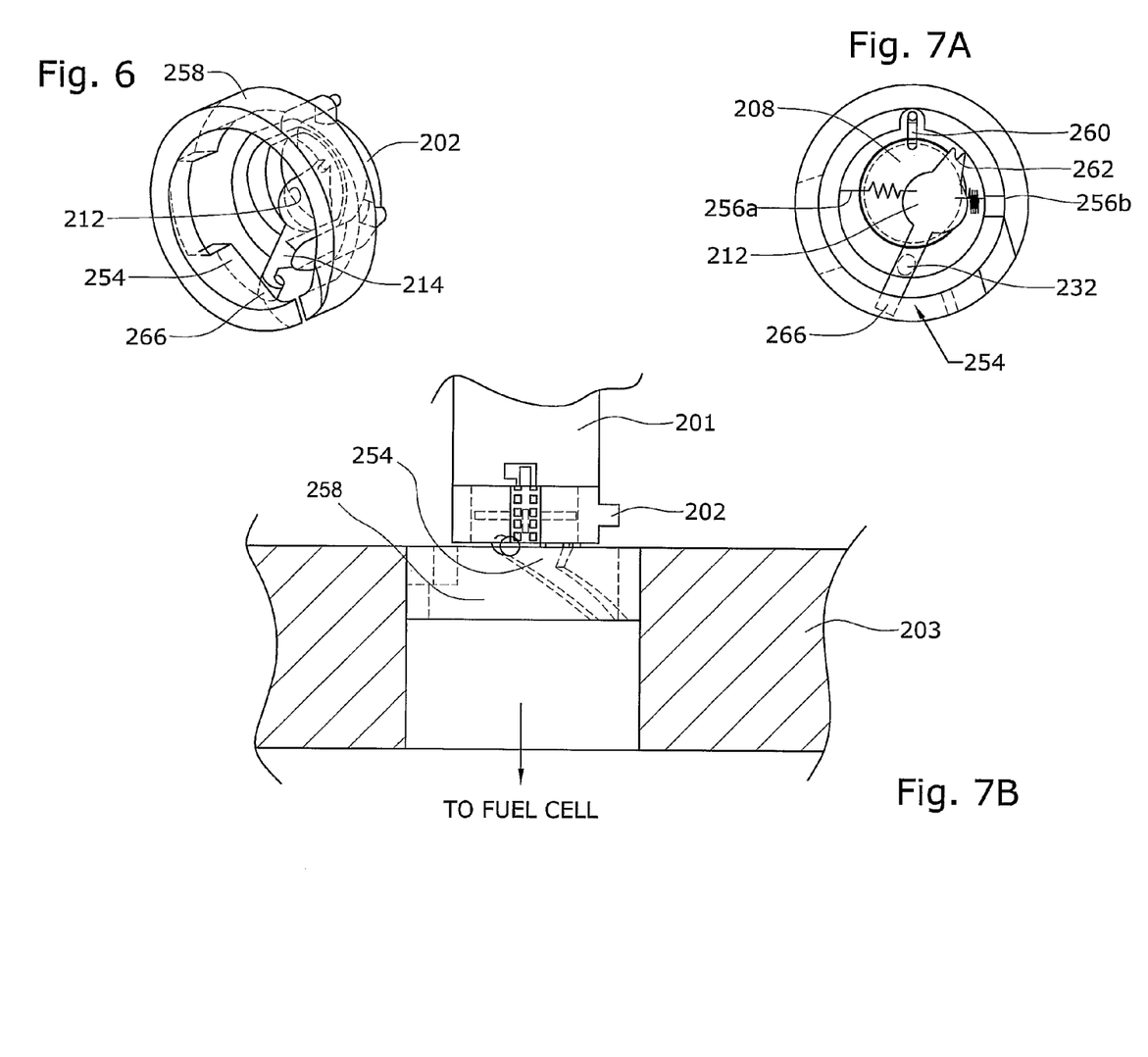
FIG. 6 is a perspective view of another alternate embodiment of a fuel supply having a closable cover.
FIG. 7A is a top view of the cover of FIG. 6.
FIG. 7B is a side view of the cover of FIG. 6.

FIGS. 6, 7A and 7B show yet another embodiment of a cover usable with a fuel supply 201 which is similar to fuel supplies 1 and 101 discussed above. In this embodiment, a cover 202 is configured to mate with a receptacle 258 attached to or configured within a host device 203. Receptacle 258 includes a ramp-like track 254 (shown best in FIG. 7B) for actuating a shutter 212 in cover 202, as will be further described below.

An opening 208 is formed in cover 202, where opening 208 is alignable with a valve component of the fuel supply. Shutter 212 is rotatably attached to cover 202 at a pivot 232, which is preferably a pin. Shutter 212 is configured to close or limit the size of opening 208. Shutter 212 is rotatable around pivot 232, and a system of centering springs 256a, 256b position shutter 212 over opening 208.

A tail end 266 of shutter 212 is configured to be inserted into track 254 when cover 202 is mated with receptacle 258. When properly aligned, tail end 266 enters track 254 upon initial insertion of cover 202 into receptacle 258. As cover 202 is pushed further into receptacle 258, the walls of track 254 push against tail end 266, thereby translating tail end 266 according to the guiding path defined by track 254. To insert cover 202 fully into receptacle 258, cover 202 is pushed with sufficient force to overcome centering springs 256a, 256b, which provide a force that resists the movement of shutter 212 away from the centered position. If sufficient force is applied, shutter 212 rotates around pivot 232 to allow access to opening 208. As shown in FIG. 7, spring 256a is stretched and spring 256b is compressed in order to allow shutter 212 to move. This stretching and compression of springs 256a, 256b stores energy therewithin. When cover 202 is removed from receptacle 258, this stored energy is released to return springs 256a, 256b to their original position, thereby repositioning shutter 212 to occlude opening 208.

Optionally, shutter 212 has formed in the free end thereof a notch 262 which snaps onto or otherwise connects to a latch 260. When the fuel supply is inserted into a host device, a release pin from the host device is inserted into latch 260, thereby freeing shutter 212 therefrom.

Figure 8:
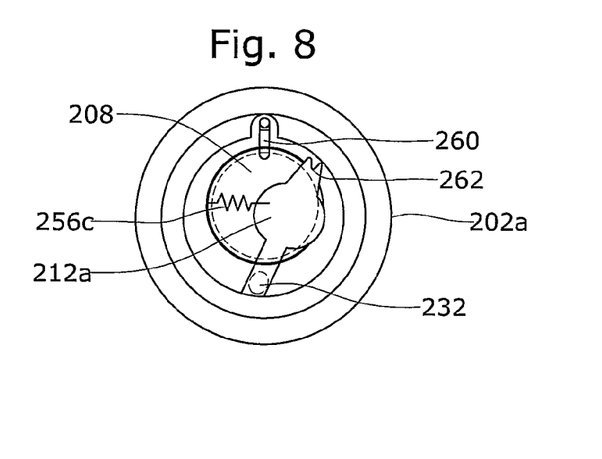
FIG. 8 is a top view of an alternate embodiment of a fuel supply having a closable cover.

Another embodiment of cover 202 designated as cover 202a is illustrated in FIG. 8. Cover 202a comprises shutter 212a pivoted at pin 232. Shutter 212a is biased by a spring 256c to the open position, as shown. Latch 260 is configured to retain shutter 212a by entering notch 262 to hold shutter 212a in the closed position, similar to shutter 212 described above. A user can move latch 260 away from notch 262 so that spring 256c biases shutter 212a to the open position. A post or protrusion from the host device can also act on latch 260 to open cover 202 when the fuel supply is inserted into the device. In this embodiment, receptacle 258 does not require a ramped track such as track 254 to actuate the movement of shutter 212a. Alternatively, spring 256c can bias shutter 212a to the closed position, and the user has to move both latch 260 and shutter 212a against spring 256c to gain access to the valve component.

Figure 9:
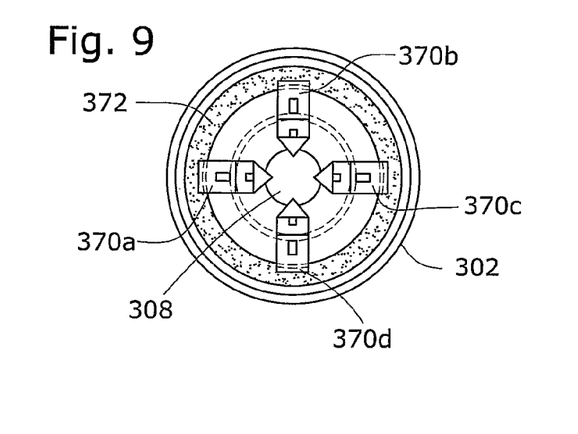
FIG. 9 is a top view of a fuel supply cover having increased operational resistance according to an aspect of the present invention.
Figure 10:
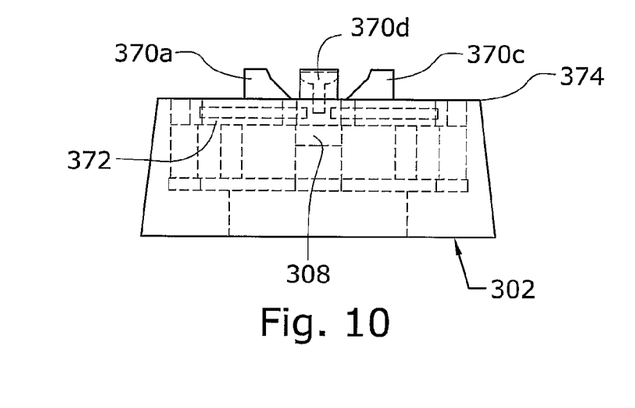
FIG. 10 is a side view of the cover of FIG. 9.

FIGS. 9 and 10 show yet another embodiment of a cover 302 configured to provide operational resistance to accessing a valve component for a fuel supply (not shown) similar to those fuel supplies described above. In this embodiment, a cover 302 includes an opening 308 configured to align with a valve component (not shown) on the fuel supply. Cover 302 includes four spring arms 370a-d angularly mounted to cover 302. In a closed configuration (not shown), spring arms 370a-d extend across an opening 308 and join together to form a shield to limit access to opening 308. While shown in FIG. 9 as having pointed tips configured to form the shield, it will be appreciated by those in the art that a number of different configurations are possible, such as interlocked leaves as on the mechanical iris of a camera. If an interlocked configuration is used, then only one of spring arms 370a-d need be actuated; due to the interlocked nature of the spring arms 370a-d, the motion of one spring arm 370 moves all of the spring arms 370a-d. Similarly, any number of spring arms 370 may be used.

Preferably, spring arms 370a-d are configured to splay outward in their neutral state such that opening 308 is accessible. Cover 302 and spring arms 370a-d are preferably co-molded from the same plastic material, although spring arms 370a-d may be attached to base 306 with spring-loaded or live hinges.

A locking ring 372 slidably encircles spring arms 370a-d. Locking ring 372 is biased toward a mating face 374 of cover 302, i.e., the interface point of cover 302 and the host device receptacle (not shown.) Any type of spring or spring-like element, such as a foam, may be used to bias locking ring 372 toward mating face 374. Locking ring 372 therefore forces spring arms 370a-d into a closed position, storing restorative energy within spring arms 370a-d (or their hinges) so that spring arms 370a-d will return to their neutral, i.e., open, state when locking ring 372 is removed.

Upon initial insertion of cover 302 into the host device, at least one projection (not shown) therefrom engages locking ring 372. As additional force is applied to cover 302 to press cover 302 further into the host device, the projection eventually overcomes the spring force biasing locking ring 372 toward mating face 374. Locking ring 372 is slidably translated away from mating face 374, thereby freeing spring arms 370a-d to flare outward to the open position. Preferably, the projection(s) are configured so as not to interfere with the restorative motion of spring arms 370a-d. Preferably, a detent system, latch, or similar mechanism is included with cover 302 and/or the host device to secure cover 302 or the fuel supply to the device.

In another embodiment, spring arms 370a-d are not configured to be held in an open position in their neutral state; spring arms 370a-d may instead be in the closed position in their neutral state. Locking ring 372 may, therefore, be omitted. As the fuel supply is attached to the host device, spring arms 370a-d provide a resistive force which is bent or is otherwise overcome in order to insert the fuel supply far enough such that the valve component is accessed. Additionally, arms 370a-d may have an angular surface or a ramp, as best shown on arms 370a and 370c in FIG. 10, so that as a corresponding valve component from the device is being inserted into opening 308 the camming action between the corresponding valve component and the angular surfaces pushes arms 370a-d away from opening 308.

Spring arms 370a-d and the host device may also be configured to provide mechanical keying, i.e., spring arms 370a-d are aligned with corresponding notches on the host device in order for the fuel supply to be inserted into the host device. This provides control over the orientation of insertion.

Figure 11:
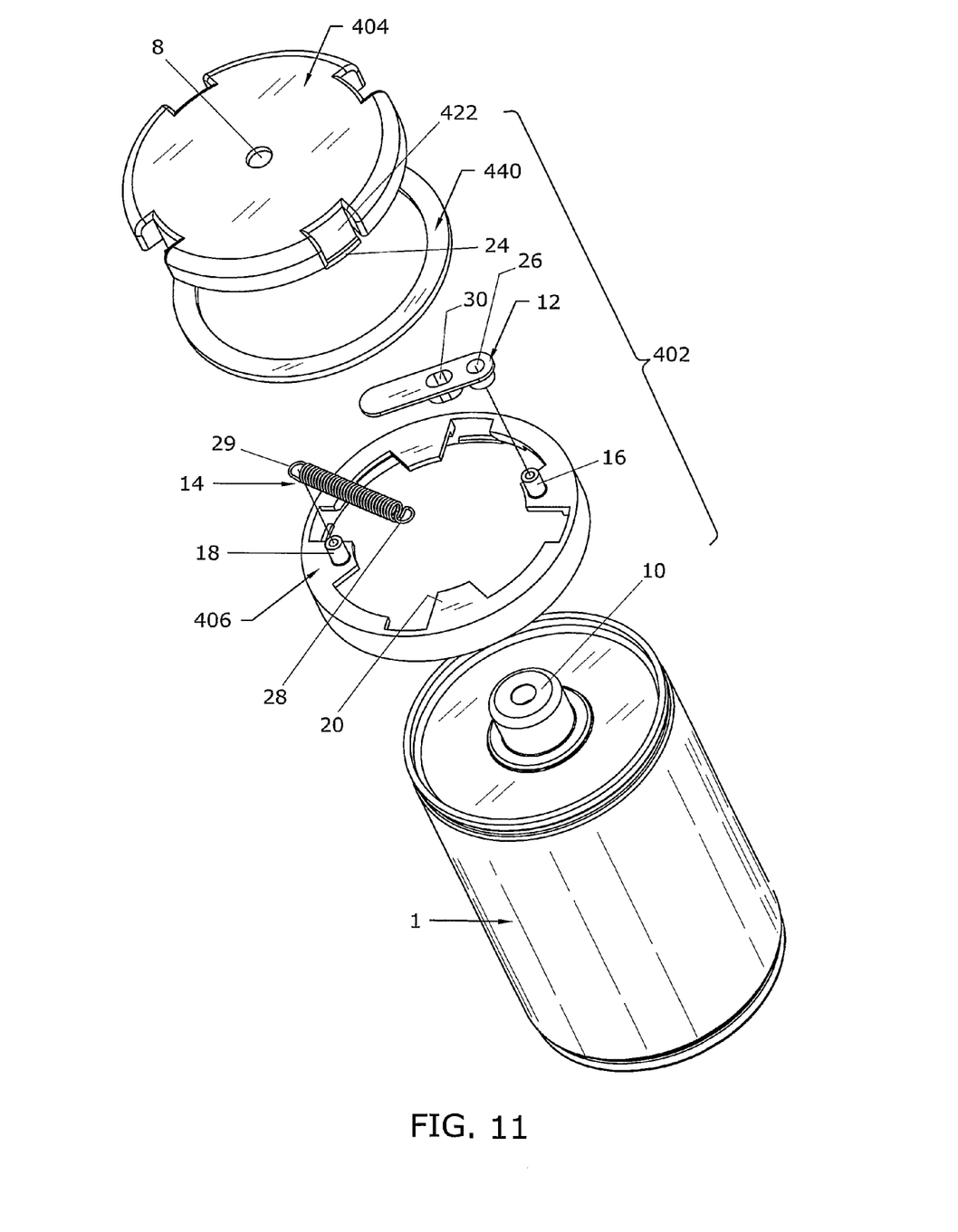
FIG. 11 is an exploded view of another embodiment of the cover of the present invention.

FIG. 11 illustrates cover 402, which is a variation of the embodiment of FIGS. 1-4. Cover 402 includes rotatable cap 404 and support 406. Rotatable cap 404 is similar to cap 4, except that legs 422 are extended downward further than legs 22 to compensate for the inclusion of a spring 440. Support 406 is similar to support 6 except that locking rail 436 has recess 438 formed thereon to retain legs 422 in the closed position. Spring 440 is disposed between cap 404 and support 406 to allow cap 404 to move toward, in addition to being rotatable relative to, support 406 after cover 402 is fully assembled.

Figure 12:
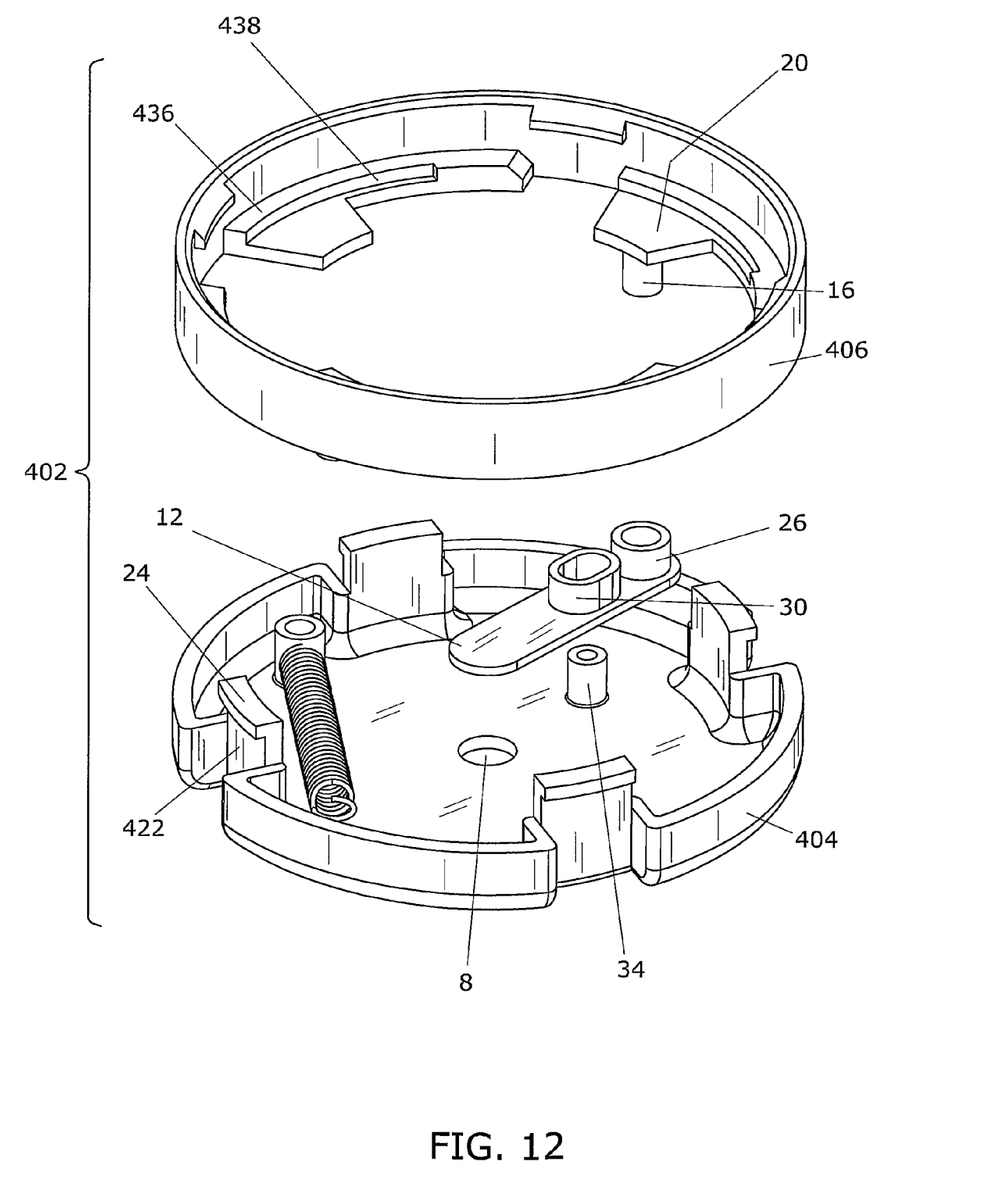
FIG. 12 is an exploded bottom view of the cap and cover of FIG. 11 in the closed position alignment.
Figure 13A:
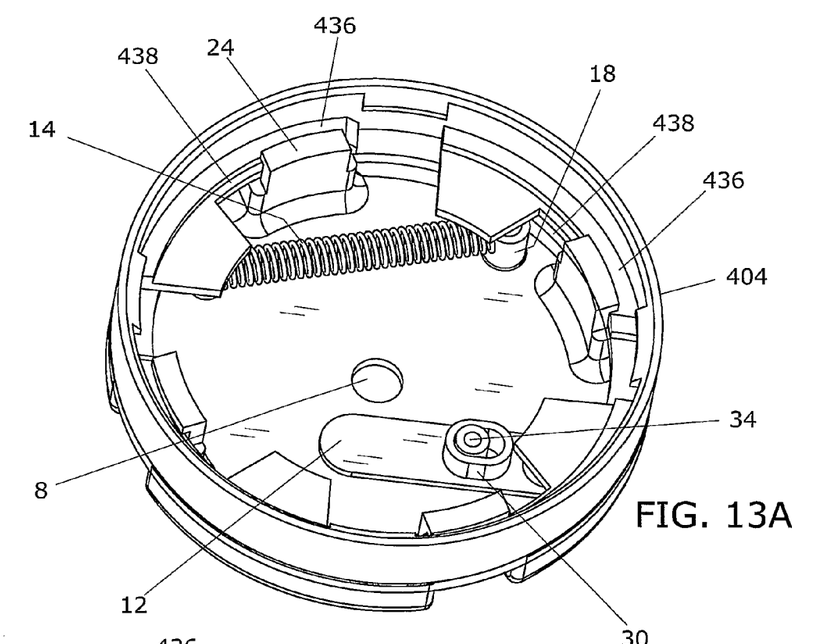
FIG. 13A is a bottom view of the assembled cover of FIG. 11 in the open position.
Figure 13B:
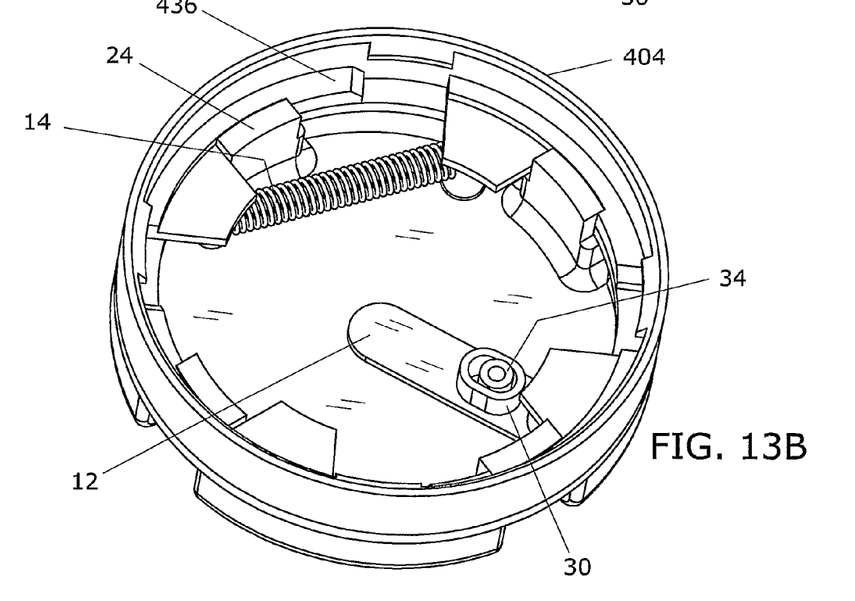
FIG. 13B is a bottom view of the assembled cover of FIG. 11 in the closed position.
Figure 14:
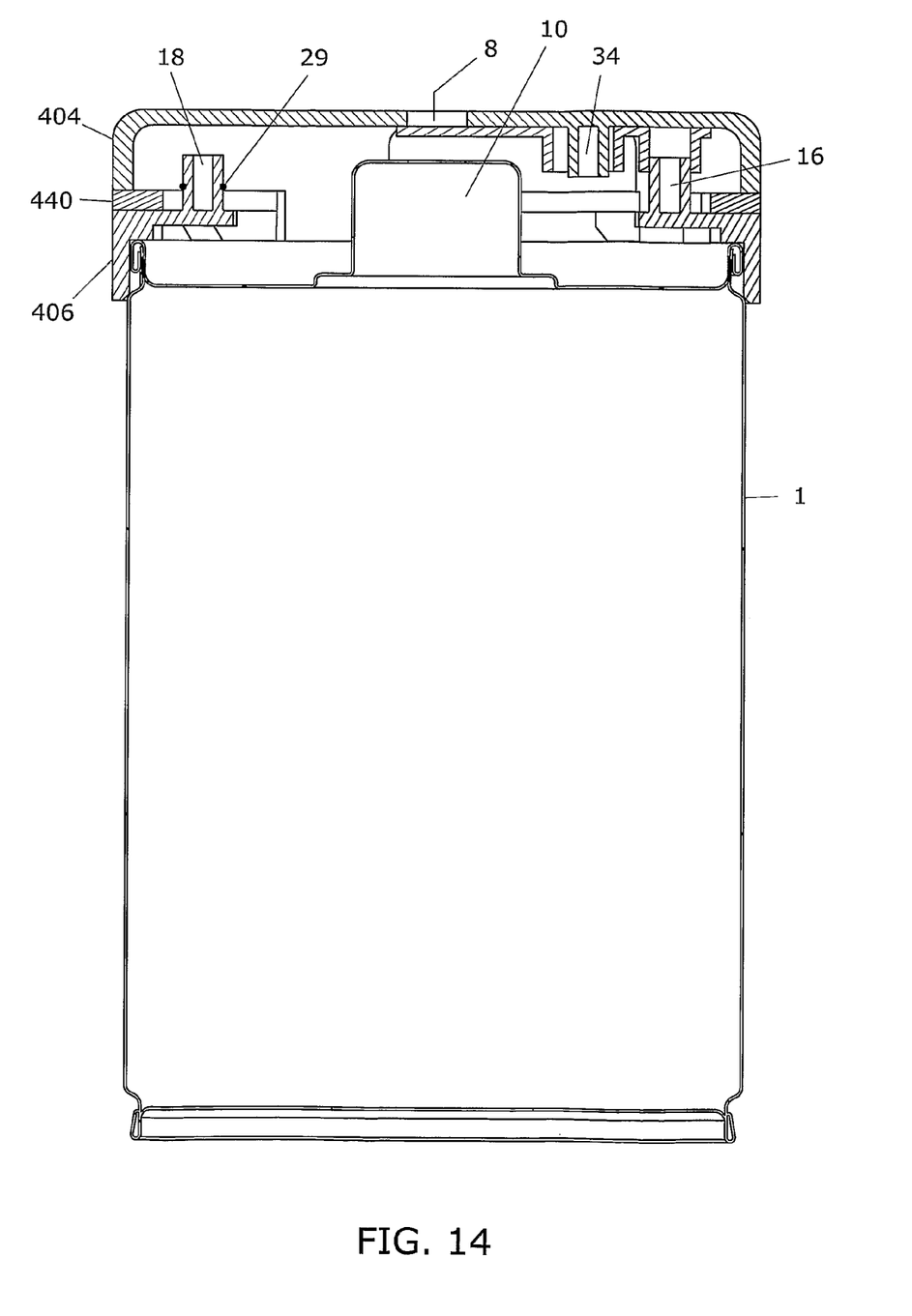
FIG. 14 is a partial cross-sectional view showing the cover of FIG. 11.

As shown in FIGS. 12, 13A, 13B and 14, when assembled in a manner similar to cover 2 discussed above, locking rim 24 of extended legs 422 are received within recess 438 on rail 436 in the closed position shown in FIGS. 12 and 13B, and cap 404 cannot be rotated relative to support 406 to move cover 402 to the open position until cap 404 is pressed against spring 440 toward support 406. After cap 404 is pressed a predetermined amount against spring 440, locking rim 24 is moved out of recess 438 and then can be moved along rail 436 to the open position shown in FIG. 13A. Hence, cap 404 is movable in two directions relative to support 406, i.e., toward support 406 and rotatable relative to support 406, to move cover 402 from the closed position to the open position. The movement in two directions increases the operational resistance of the fuel supply of the present invention. Cap 404 can be moved from the closed position to the open position by the user or during the insertion into the device. Similar to cover 2, when the applied force is removed cover 402 is biased by spring 14 back to the closed position.

Spring 440 can be any compression spring known in the art. As shown, spring 440 is a foam spring, but spring 440 can be an elastomeric O-ring, a helical spring or a plurality of leaf springs. Preferably, spring 440 is a high force spring, as discussed above relative to spring 14, to increase the difficulty of operation for unintended users.

Other embodiments of the present invention will be apparent to those skilled in the art from consideration of the present specification and practice of the present invention disclosed herein. For example, any of the valves herein may be triggered by an electronic controller such as a microprocessor. Also, a pump may be included to pump the fluid fuel component into the host device. It is intended that the present specification and examples be considered as exemplary only with a true scope and spirit of the invention being indicated by the following claims and equivalents thereof.

We claim:
1. A fuel cell system comprising
a fuel supply having a valve component,
wherein a fuel stored in the fuel supply can be transported through the valve component to the fuel cell and
a cover attached to the fuel supply, said cover comprises a cap and a support, wherein the cap and the support are rotatably movable relative to each other to cause the cover to move between an open position where access to the valve component is not limited and a closed position where access to the valve component is limited,
wherein an opening is formed on the cap and said opening is aligned with the valve component, and wherein the cover further comprises a shutter that at least partially occludes said opening when the cover is in the closed position.

2. The fuel cell system of claim 1, wherein the cap is normally biased so that the cover is in the closed position.

3. The fuel cell system of claim 1, wherein the shutter is rotatably attached to the cover.

4. The fuel cell system of claim 1, further comprising a fuel absorbent material.

5. A fuel cell system comprising
a fuel supply having a valve component,
wherein a fuel stored in the fuel supply can be transported through the valve component to the fuel cell and
a cover attached to the fuel supply, said cover comprises a cap and a support, wherein the cap and the support are rotatably movable relative to each other to cause the cover to move between an open position where access to the valve component is not limited and a closed position where access to the valve component is limited,
wherein the cover further comprises a spring connecting the cap to the support to bias the cap to put the cover in the closed position.

6. The fuel cell system of claim 5, wherein the cap comprises at least one downwardly extending leg adapted to be received by the support to retain the cap to the support.

7. The fuel cell system of claim 6, wherein the leg comprises a rim adapted to ride on a track formed on the support.

8. A fuel cell system comprising
a fuel supply having a valve component,
wherein a fuel stored in the fuel supply can be transported through the valve component to the fuel cell and
a cover attached to the fuel supply, said cover comprises a cap and a support, wherein the cap and the support are rotatably movable relative to each other to cause the cover to move between an open position where access to the valve component is not limited and a closed position where access to the valve component is limited,
wherein the cap comprises at least one downwardly extending leg adapted to be received by the support to retain the cap to the support and wherein the leg comprises a rim adapted to ride on a track formed on the support
wherein a compression spring is disposed between the cap and the support, wherein the track includes a rotation barrier configured to receive the leg, wherein the rotation barrier inhibits rotational motion of the cap relative to the support until the leg is released from the rotation barrier.

9. A fuel supply comprising:
a housing containing fuel;
a valve component in fluid communication with the fuel;
a valve cover having a movable shutter for controlling access to the valve component, wherein the shutter comprises at least one spring arm movable to limit access to the valve component, and
a locking element surrounding the at least one spring arm holding the at least one spring arm in an occluding position relative to the valve component.

10. The fuel supply of claim 9, wherein the at least one spring arm has a neutral position in a non-occluding position.

11. A fuel cell system comprising a fuel supply and a host device, wherein the fuel supply comprises:
a housing containing fuel;
a valve component in fluid communication with the fuel; and
a valve cover having a movable shutter for controlling access to the valve component, wherein the shutter is rotatable relative to the cover,
wherein the host device comprises a guiding path and a portion of the shutter is inserted in the guiding path when the fuel supply is connected to the host device, and wherein the guiding path is configured to move the shutter to a non-occluding position.

12. The fuel cell system of claim 11, wherein the shutter is held in an occluding position relative to the valve component.

13. A fuel supply having a valve component, wherein a fuel stored in the fuel supply can be transported through the valve component to a fuel cell, wherein the fuel supply comprises
a cover attached to the fuel supply and having an opening that aligns with the valve component and a shutter wherein the cover and the shutter are movable relative to each other to cause the shutter to move between an open position where access to the valve component is not limited and a closed position where access to the valve component is limited,
wherein relative movement between the cover and the shutter to move the shutter between the open position and closed position is prevented until an interference is removed.

14. The fuel supply of claim 13, wherein the cover comprises a cap and a support and the cap and support are rotatable relative to each other to move the shutter between the open position and the closed position.

15. The fuel supply of claim 13, wherein the cover comprises a cap and a support and the interference between the cap and the support is removed when the cap and the support are moved toward each other.

16. The fuel supply of claim 15, wherein a spring is disposed between the cap and the support.

* * * * *